United States Patent [19]
Wassenaar

[11] 3,875,854
[45] Apr. 8, 1975

[54] APPARATUS FOR CANNING FOOD

[75] Inventor: Siek Wassenaar, Agincourt, Ontario, Canada

[73] Assignee: The Raymond Lee Organization, Inc., New York, N.Y. ; a part interest

[22] Filed: Mar. 25, 1974

[21] Appl. No.: 454,390

[52] U.S. Cl. .................. 99/332; 99/359; 219/491; 236/46
[51] Int. Cl. ............................. A47j 27/00
[58] Field of Search ....... 236/46; 126/39 G; 99/331, 99/421 TP, 332, 333, 359; 219/412, 413, 491, 492, 493

[56] References Cited
UNITED STATES PATENTS 2,657,580  11/1953  Schroeder............................ 99/331
3,326,692  6/1967  Martino et al..................... 99/331 X
3,332,338  7/1967  Wein................................ 99/331 X Primary Examiner—William E. Wayner
Assistant Examiner—W. E. Tapolcai, Jr.

[57] ABSTRACT

Food to be canned is inserted in suitable containers in an oven operated at a preset temperature. A timer when energized runs for a preset period and then turns the oven off. A liquid carrying container also in the oven carries a thermocouple. When the water boils, the couple produces a signal, which is used to energize the timer. After the oven cools, the container can be removed.

3 Claims, 3 Drawing Figures

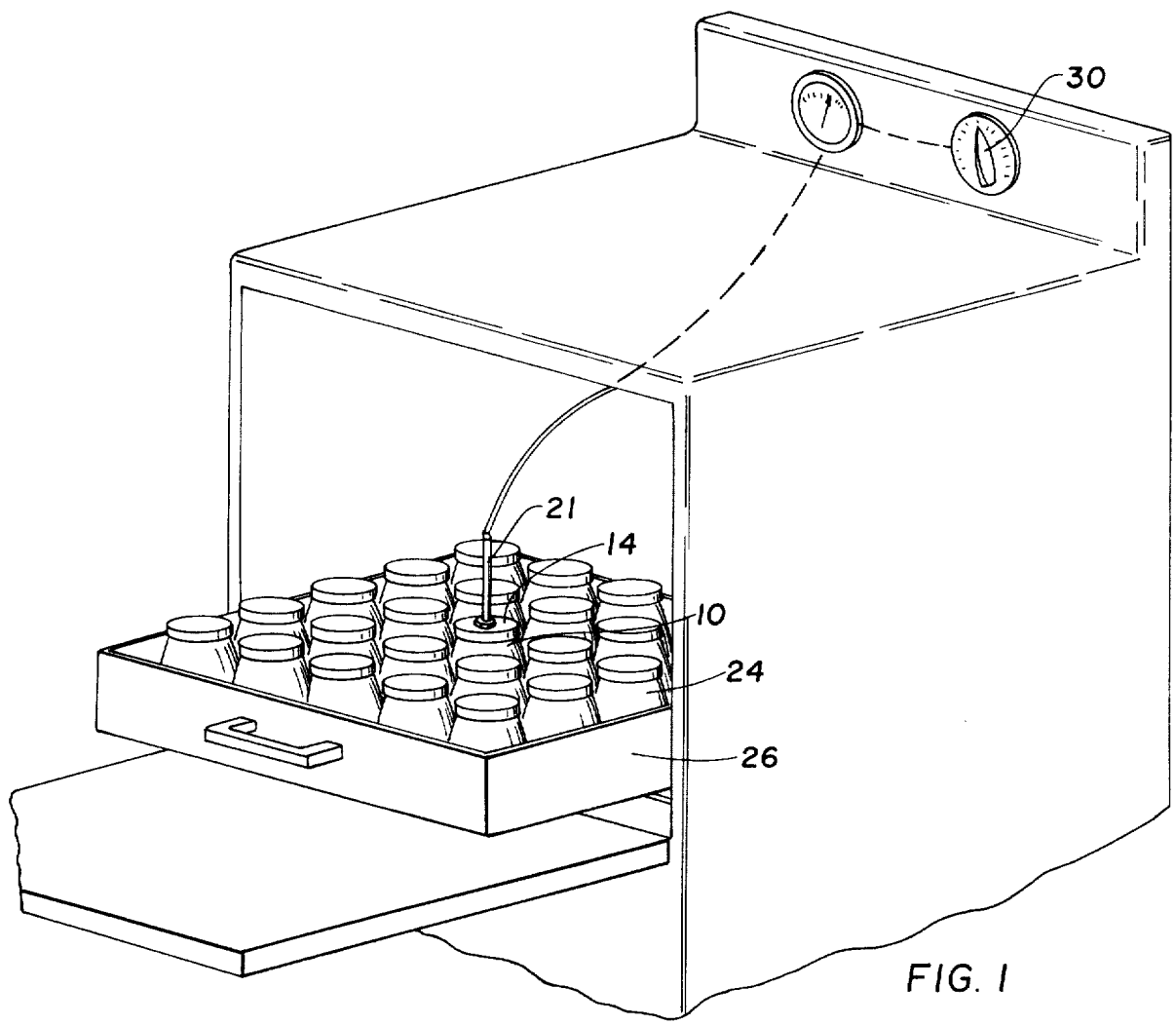
FIG. 1
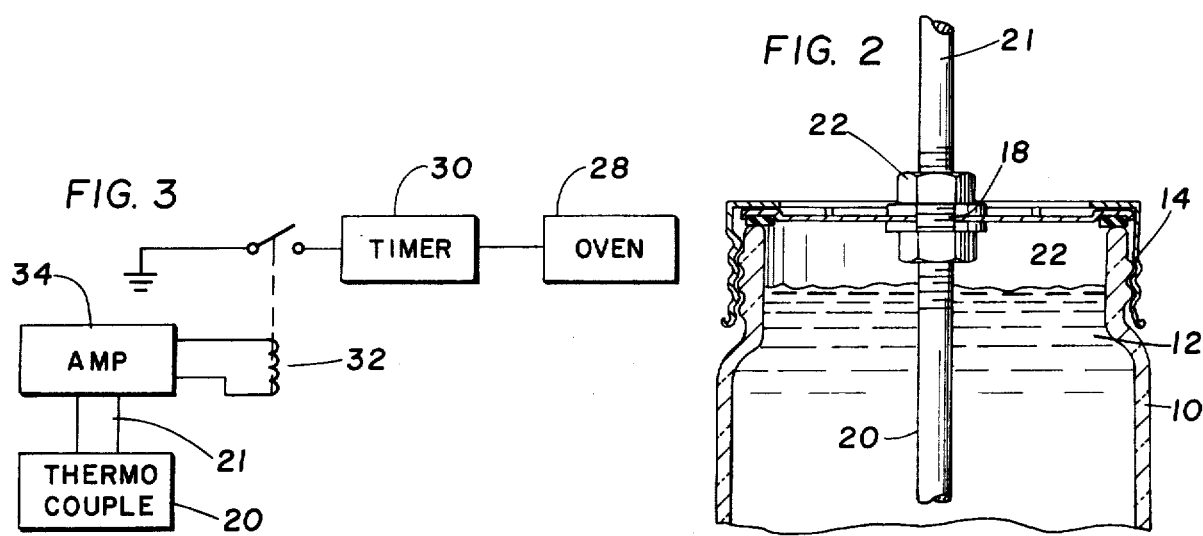
FIG. 2
FIG. 3

APPARATUS FOR CANNING FOOD

SUMMARY OF THE INVENTION

In home canning operations, the housewife sterilizes food canned by inserting the containers filled with food in boiling water for a selected period. Normally this is done in small containers which rest on top of the stove and produce steam which raises the humidity and causes discomfort.

In this invention, the containers are inserted into an oven which is turned on and set to a temperature (212°F) at which sterilization will take place. The oven is provided with a timer which can be preset for a selected period. When the timer is energized, it will run for this period. At the expiration of this period, the timer turns the oven off, at which point the oven cools in a natural manner and the containers also cool to room temperature and can then be removed for storage.

To control the timer, a liquid carrying container with a temperature sensor therein is inserted into the oven with the food containers. The sensor produces a signal when the liquid in the container reaches 212°F. Means responsive to the signal energizes the timer to control the process.

BRIEF DESCRIPTION OF THE DRAWINGS

In the drawings:

FIG. 1 is a perspective view of the invention in use;

FIG. 2 is a detail view of a portion of the equipment used in the structure of FIG. 1; and FIG. 3 is a circuit diagram of the invention.

DETAILED DESCRIPTION OF PREFERRED EMBODIMENTS

Referring now to FIGS. 1-3, a mason jar 10 filled with liquid 12 has removable cap 14. The cap has a central hole 18 and thermocouple 20 is held vertically in the hole by suitable means 22 with cable 21 extending therefrom. The couple is designed to produce a voltage or EMF which increases with increasing water temperature to a selected value when the water boils.

This jar is disposed in the center of a group of canned food containing jars 24 disposed in pan 26 which in turn is loaded into oven 28. The jars 24 use the same liquid such as water or syrup as jar 10.

The oven is turned on and set at 212°F. A timer 30 which can be preset to a variety of different times is normally deenergized. When relay 32 is energized, the timer is energized, runs for its preset period and turns the oven off when the period ends.

An amplifier 34 connected at its input via cable 21 to the couple is connected at its output to relay 32. When the selected voltage value appears at the input, the amplifier produces a voltage sufficient to energize the relay and energize the timer. The amplifier does not respond to lower input voltages and when the amplifier does not respond, the relay is deenergized.

The invention can then be used as described.

The pan captures and confines any breakage and enables large numbers of containers to be processed at one time. The central position of jar 10 insures that when it is heated to temperature all other containers will be at this temperature.

By using different temperature settings to cause the amplifier to be energized, that is by adjusting the amplifier to respond to particular voltages corresponding to the temperatures in question, the invention can be used for example to make yogurt at 106°F, for rising bread dough at 80°F and the like.

While I have described my invention with particular reference to the drawings, such is not to be considered as limiting its actual scope.

Having thus described this invention, what is asserted as new is:

1. Apparatus used in canning food in a timer controlled oven, said timer when energized running for a preset period and at the expiration of the period turning the oven off comprising:
   a mason jar insertable into and removable from the oven, said jar containing liquid;
   a removable cap for said jar;
   a temperature sensor set to produce a preselected voltage when ambient temperature reaches 212°F;
   first means to secure said sensor to said cap in such manner that the sensor contacts the water; and
   second means coupled to said sensor and to said timer to energize said timer when the sensor produces said voltage.

2. Apparatus of claim 1 wherein said sensor is a thermocouple.

3. Apparatus of claim 2 wherein the second means includes an amplifier and a relay.

\* \* \* \* \*